Figure 1:
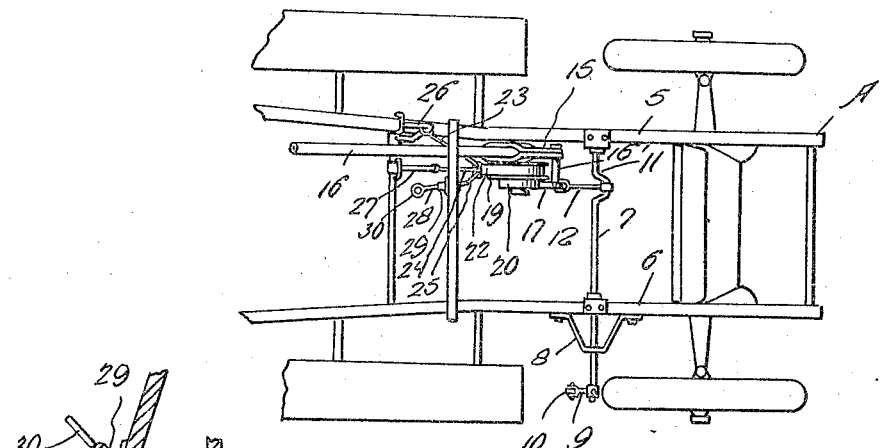

May 25, 1926.

H. RICH 1,586,117

AUTOMOBILE SAFETY DEVICE

Filed June 15, 1925     2 Sheets-Sheet 1

Inventor
Homer Rich

By Clarence A. O'Brien
Attorney

May 25, 1926.

H. RICH 1,586,117

AUTOMOBILE SAFETY DEVICE

Filed June 15, 1925   2 Sheets-Sheet 2

Inventor
Homer Rich,
By Clarence A. O'Brien
Attorney

Patented May 25, 1926.

1,586,117

UNITED STATES PATENT OFFICE.

HOMER RICH, OF VINCENNES, INDIANA, ASSIGNOR OF ONE-EIGHTH TO JOHN M. LATSHAW, OF OAKTOWN, INDIANA.

AUTOMOBILE SAFETY DEVICE.

Application filed June 15, 1925. Serial No. 37,254.

This invention relates to a safety device for automobiles, and has for its object to provide means for actuating the control pedals to stop the car, said means being placed in operation by a mechanism arranged at a railroad crossing, thereby forcing a motorist to stop his car, before actually crossing the railroad.

Another important object of the invention is to provide a device of this nature, which may be easily and quickly reset by the motorist so that he may proceed in the usual manner after having made the stop.

The device is also useful on exceedingly dangerous curves and may be used to advantage at the top of a hill, so that the motorist will stop and have an opportunity of placing his car in a lower gear than the usual driving gear.

Another important object of the invention is to provide a safety device of this nature, which includes a spring rotatable drum having a belt adapted to wind thereon as the spring unwinds for the purpose of pulling downwardly upon the control pedals which are used to release the clutch and apply the brakes, and releasable means for holding the spring normally wound up and the belt unwound from the drum.

Another important object of the invention is to provide a tripping structure which is placed in an operative position by the wheels of an automobile passing thereover, and which normally returns to an inoperative position, after the wheels have passed completely thereover.

A still further important object of the invention is to provide a safety device of this nature, which is rather simple in its construction, strong, durable, efficient and reliable in operation, not likely to become out of order, easy to manipulate, and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

Figure 2:
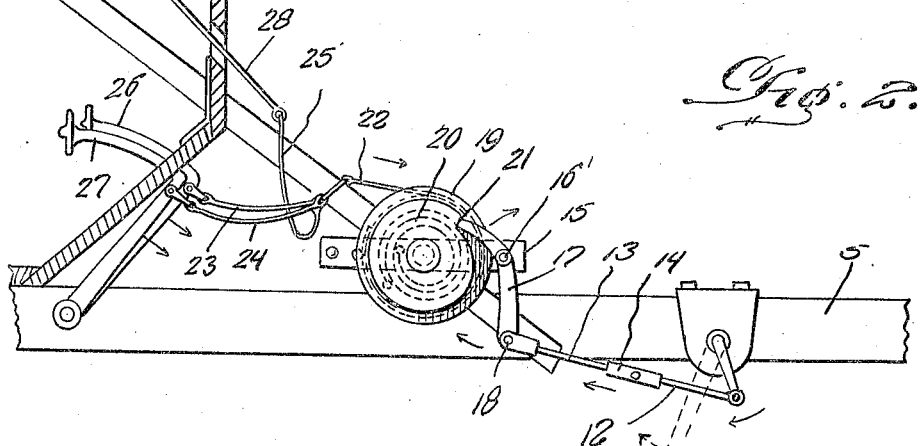
Figure 3:
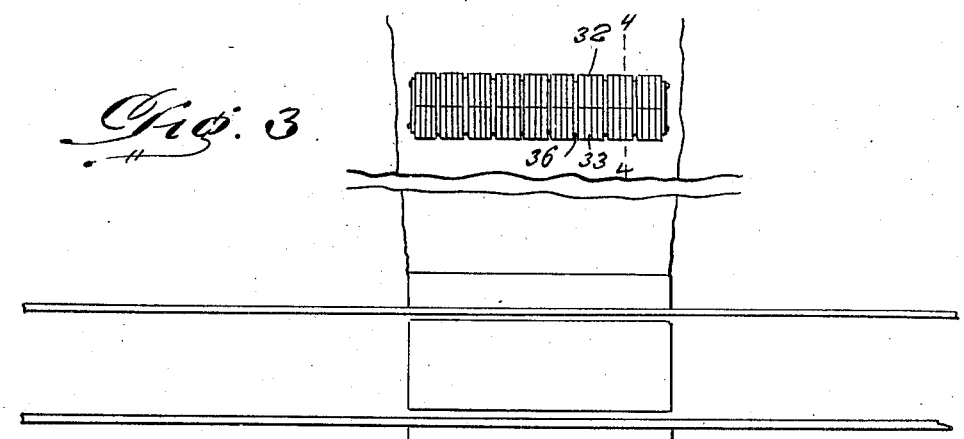
Figure 4:
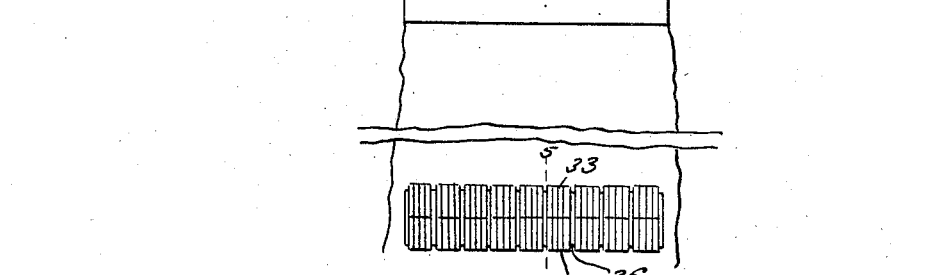
Figure 5:
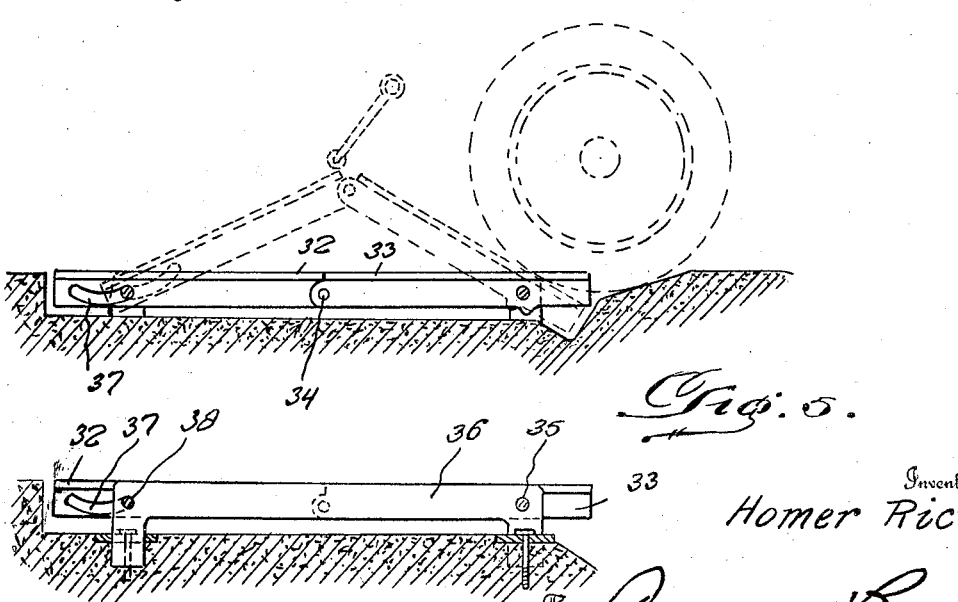

In the drawings:

Figure 1 is a top plan view of an automobile chassis, showing my safety device applied thereto, Figure 2 is a side elevation of the safety device, Figure 3 is a plan view of a railroad crossing, showing my improved tripping mechanism associated therewith, and Figures 4 and 5 are sectional views, on an enlarged scale, taken approximately on the lines 4—4 and 5—5 respectively of Figure 3.

Referring to the drawings in detail, it will be seen that A designates generally an automobile chassis having the eye beams 5 and 6. A crank shaft 7 is journaled in the beams 5 and 6, extending beyond the outer side of the beam 6 through a suitable bracket 8, and on the end thereof has fixed a trip arm 9 having a roller 10 journaled in the end thereof. The crank 11 of the crank shaft 7 is disposed between the side beams 5 and 6, preferably adjacent the beams 5, in a left hand drive automobile, but in a right hand drive automobile, the crank would be formed adjacent the beams 6. A link 12 is engaged with the crank 11 and comprises a pair of sections 13, adjustably held together by a turn buckle or the like 14, so that the length of the links may be adjusted. A clamp 15 is engaged with the steering column 16 below the dash board and forwardly thereof. A pin 16′ projects laterally from the forward end of the clamp 15 and pivotally supports a pawl 17, which is pivotally engaged at one end as at 18, to one end of the link 13. A spring actuated drum 19 is mounted on the clamp 15 and has a disc 20 thereto and provided with a notch 21, with which the pawl 17 is normally engaged, so as to hold the spring on the drum wound up. A flexible member 22 has one end fixed to the drum and is windable thereabout but is normally unwound therefrom when the dog engages the notch 21. Cables 23 and 24 are connected to the flexible member 22 and also to the clutch and brake pedals 26 and 27 respectively. A cable 25 is also engaged with the flexible member 22 and to a rod 28, extending through the dash board and instrument board and through a sleeve 29 mounted on the instrument board. The rod terminates in a finger loop 30, which normally rests against the ends of the sleeve 29.

As the description has thus far progressed, it will be seen that when the trip arm 9 is swung rearwardly or in the direction of the dotted line arrow, in Figure 2, the link 13 will be actuated to release the pawl 17 from the notch 21 of the disc 20, so that the spring actuated drum will be free to rotate and wind thereon the flexible member 22, thereby pulling upon the cables 23 and 24 to release the clutch and apply the brake at the same time making the cable 25 substantially taut. To reset the device, it is only necessary to pull upwardly on the loop or ring 30 and thereby unwind the flexible member 22 from the drum, winding up the spring thereof and allowing the pawl 17 to again engage the notch 21.

In Figures 3, 4, and 5, I have illustrated to advantage the trip arm actuating mechanism, which is adapted to be placed adjacent the portion of the road where it is desired to stop the machine. This trip arm actuating mechanism includes a plurality of links grouped in desired numbers to extend across the road, so that the vehicle must pass thereover. Each trip includes a pair of sections 32 and 33, pivoted together as at 34. The ends of the sections 33 are pivoted on a rod 35, supported between members 36. The other sections 32 have slots 37 in their ends for receiving rods 38 passing transversely between the members 36. The roadway immediately beyond the outer ends of the sections 33 is dug away or may be at the top of a hill and therefore sloped away, so that as the front wheels of the vehicles pass over the trips and engage the sections 33 disposed beyond the rods 35, said sections will be broken out of alignment, to take the dotted line positions shown in Figures 2 and 4. Thus, the breaking point between these sections will be in the path of the trip arm 9 which is located immediately behind one of the front wheels, and thus the clutch spring will be actuated as hereinbefore stated in detail. After the front wheels have passed over the ends of the sections 33, the trips will fall into their usual positions with each trip in alignment.

It is thought that the construction, operation, and advantages of the invention will now be clearly understood and appreciated, without a more detailed description thereof: The present embodiment of the invention has been disclosed merely by way of example, and attains all of the features enumerated as desirable in the statement of the invention and the above description.

It will further be apparent that numerous changes in the details of construction and in the combination and arrangement of parts may be resorted to, without departing from the spirit or scope of this invention, as hereinafter claimed, or sacrificing any of its advantages.

Having thus described my invention, what I claim as new is:

1. A mechanism of the class described including a spring actuated drum, means for normally holding the drum in an inactive position, a flexible member associated to wind on the drum and adapted to be operatively connected with the control pedals of an automobile, and an apparatus for releasing the drum, in order that the flexible member may be wound thereon, and the control pedals actuated to stop the automobile.

2. In combination with an automobile having control members, of a safety device comprising a spring actuated drum, a flexible member windable upon the drum and connected to the control members, and releasable means for normally holding the drum inactive.

3. In combination with an automobile having control members, of a safety device comprising a spring actuated drum, a flexible member windable upon the drum and connected to the control members, releasable means for normally holding the drum inactive, and an apparatus for releasing said means.

4. An attachment for an automobile having control members comprising a spring actuated drum, a flexible member windable on the drum and operatively connected with the control members, a disc on the drum having a notch, a pivoted pawl engaged with the notch to hold the drum inactive, and means for releasing the pawl.

5. An attachment for an automobile having control members comprising a spring actuated drum, a flexible member windable on the drum and operatively connected with the control members, a disc on the drum having a notch, a pivoted pawl engaged with the notch to hold the drum inactive, a crank shaft, a link connecting the crank of the crank shaft with the pawl, and a trip arm on the shaft adapted to be swung by engaging an obstacle on the road, so as to release the pawl and allow the operation of the spring actuated drum to wind the flexible member thereon and to operate the control members.

6. An attachment for an automobile wherein the automobile is provided with control members, comprising a spring actuated drum, a flexible member windable on the drum, branches leading from the flexible member, some of said branches operatively connected with the control members, a rod connected with the other branch, releasable means for holding the drum normally inactive, and means for releasing the aforementioned means whereby the drum will operate to wind the flexible member thereon, and actuate the control members to stop the automobile, after which the rod may be pulled for resetting the attachment.

In testimony whereof I affix my signature.

HOMER RICH.